April 26, 1960

F. A. HOWARD 2,934,127

DUAL-VALVED SAFETY PNEUMATIC TIRE

Filed March 2, 1956

5 Sheets-Sheet 3

INVENTOR.
FRANK A. HOWARD

BY Kenyon & Kenyon
ATTORNEYS

April 26, 1960  F. A. HOWARD  2,934,127
DUAL-VALVED SAFETY PNEUMATIC TIRE
Filed March 2, 1956  5 Sheets-Sheet 4

INVENTOR.
FRANK A. HOWARD
BY
Kenyon & Kenyon
ATTORNEYS

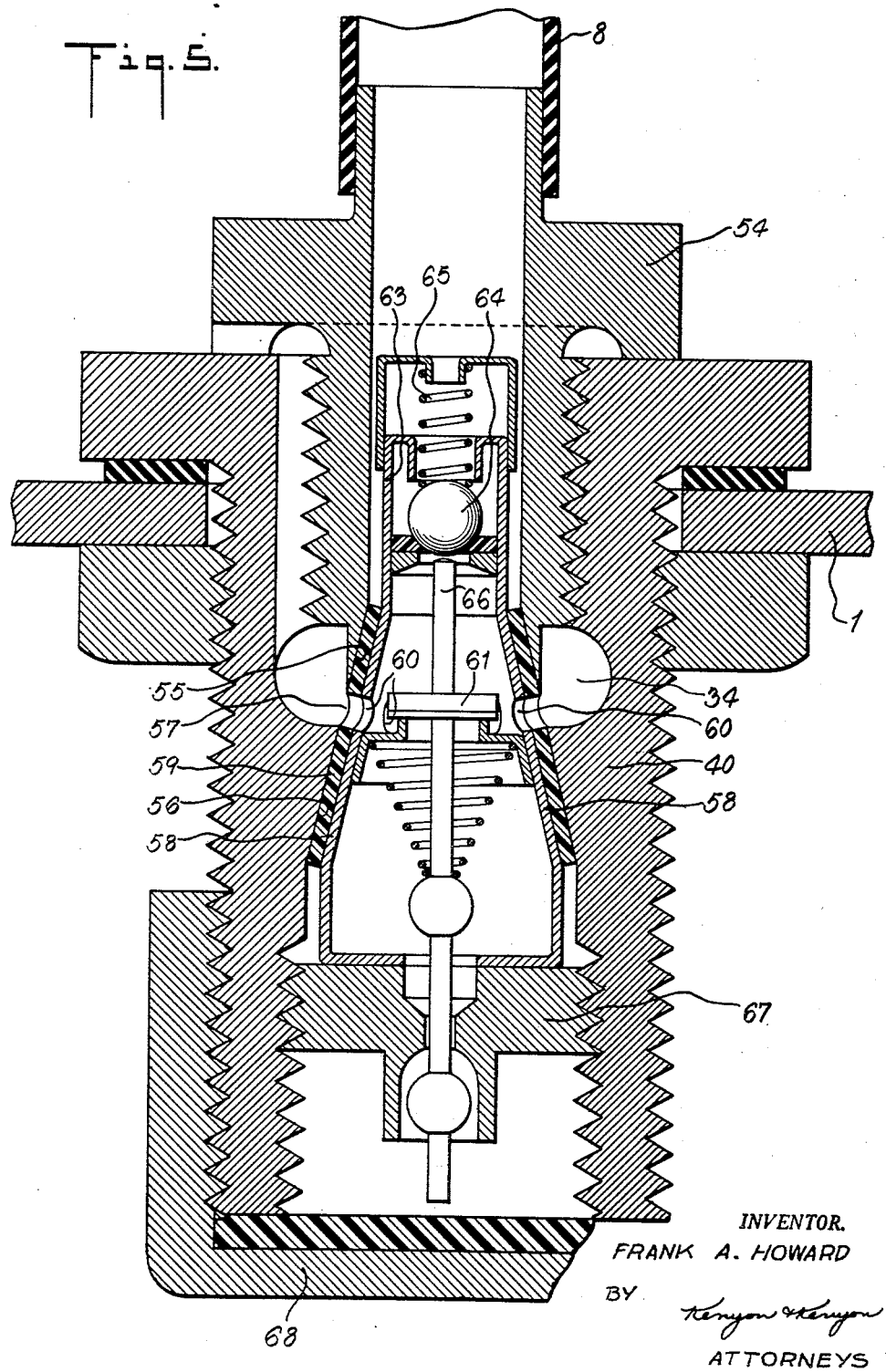

United States Patent Office 2,934,127
Patented Apr. 26, 1960

2,934,127

DUAL-VALVED SAFETY PNEUMATIC TIRE

Frank A. Howard, New York, N.Y.

Application March 2, 1956, Serial No. 569,074

2 Claims. (Cl. 152—427)

This invention relates to pneumatic tires and more especially to a dual valve combination in which a tubeless tire equipped with an omega-type safety ring becomes in effect a complete inner and outer tire, the inner tire being capable of carrying the load for a time and distance adequate to permit continued running at moderate speed of a convenient point having all facilities needed for making repairs to the tire or replacing it. Thus it becomes unnecessary in ordinary use of the car in populated areas to carry a spare tire mounted on a wheel or rim, a wrench, and a jack, as is now universal practice. To accomplish these results there may be employed any standard form of tubeless tire equipped with a strong omega safety ring, the opening in the safety ring being connected with a special form of tire valve which will permit simultaneous inflation or deflation of both inner and outer chambers of the tire, but which will prevent escape of air from the inner chamber enclosed by the safety ring and rim into the outer chamber enclosed by the tire itself in the event of a puncture or any failure of the tire.

Figure 1:
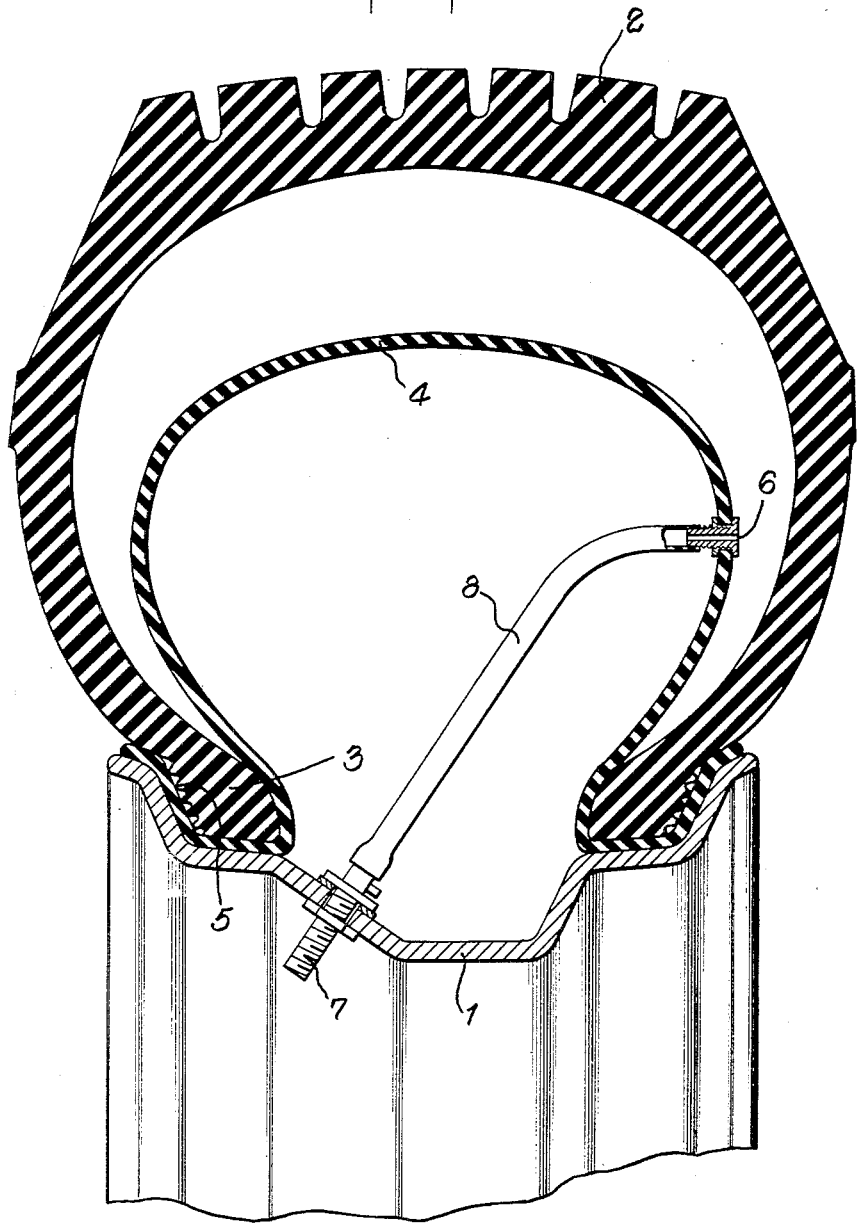
Figure 2:
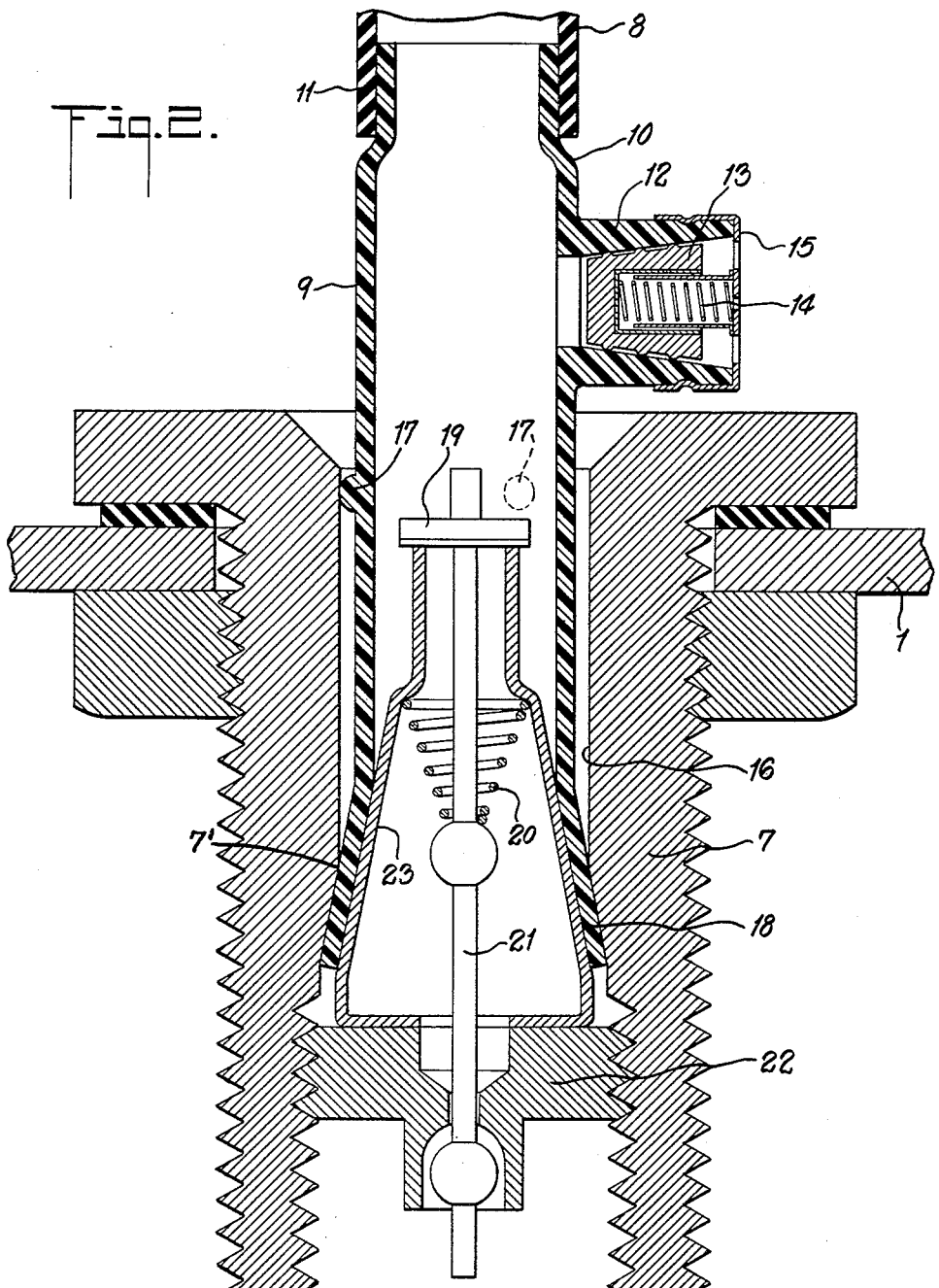
Figure 3:
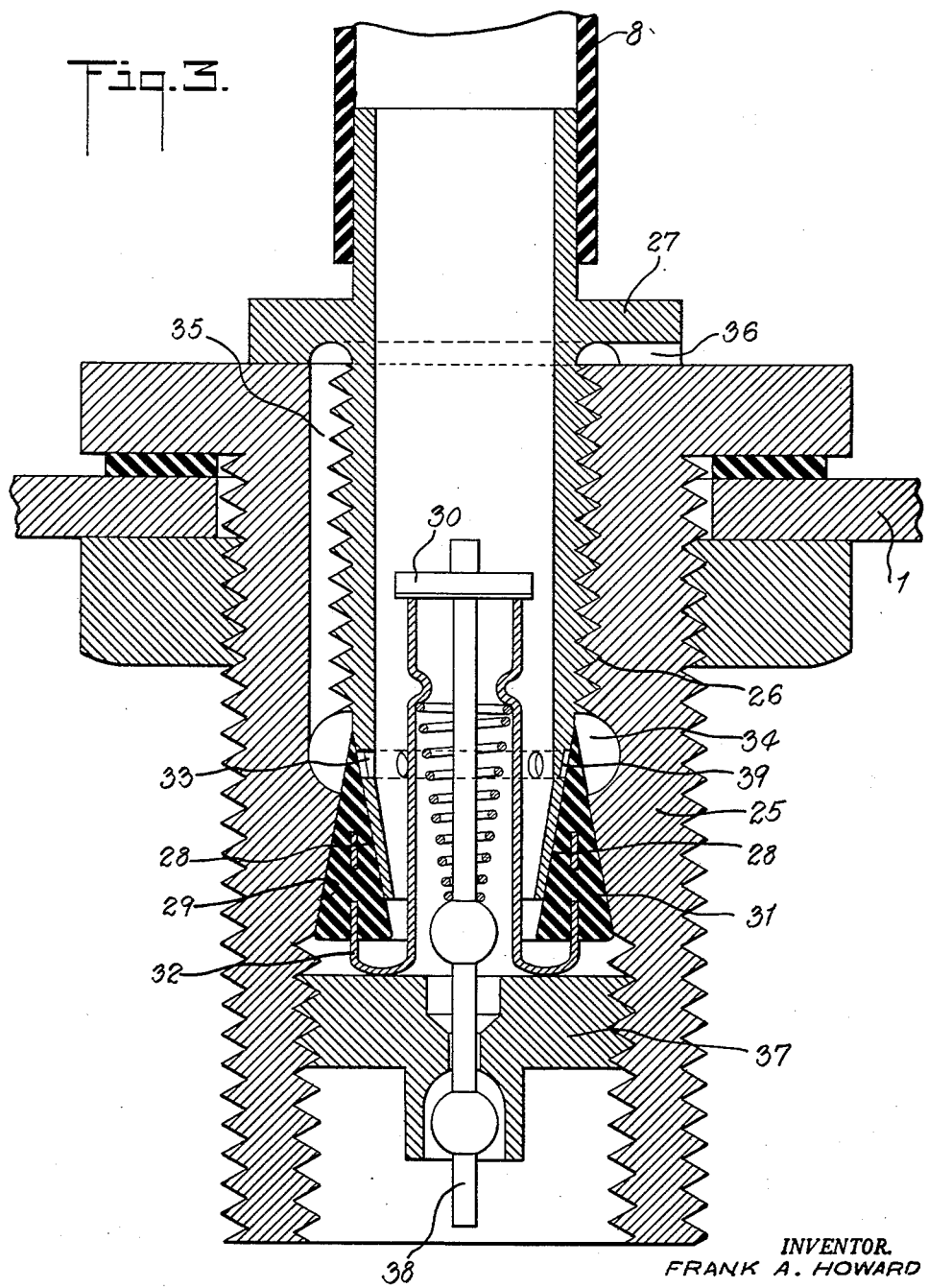
Figure 4:
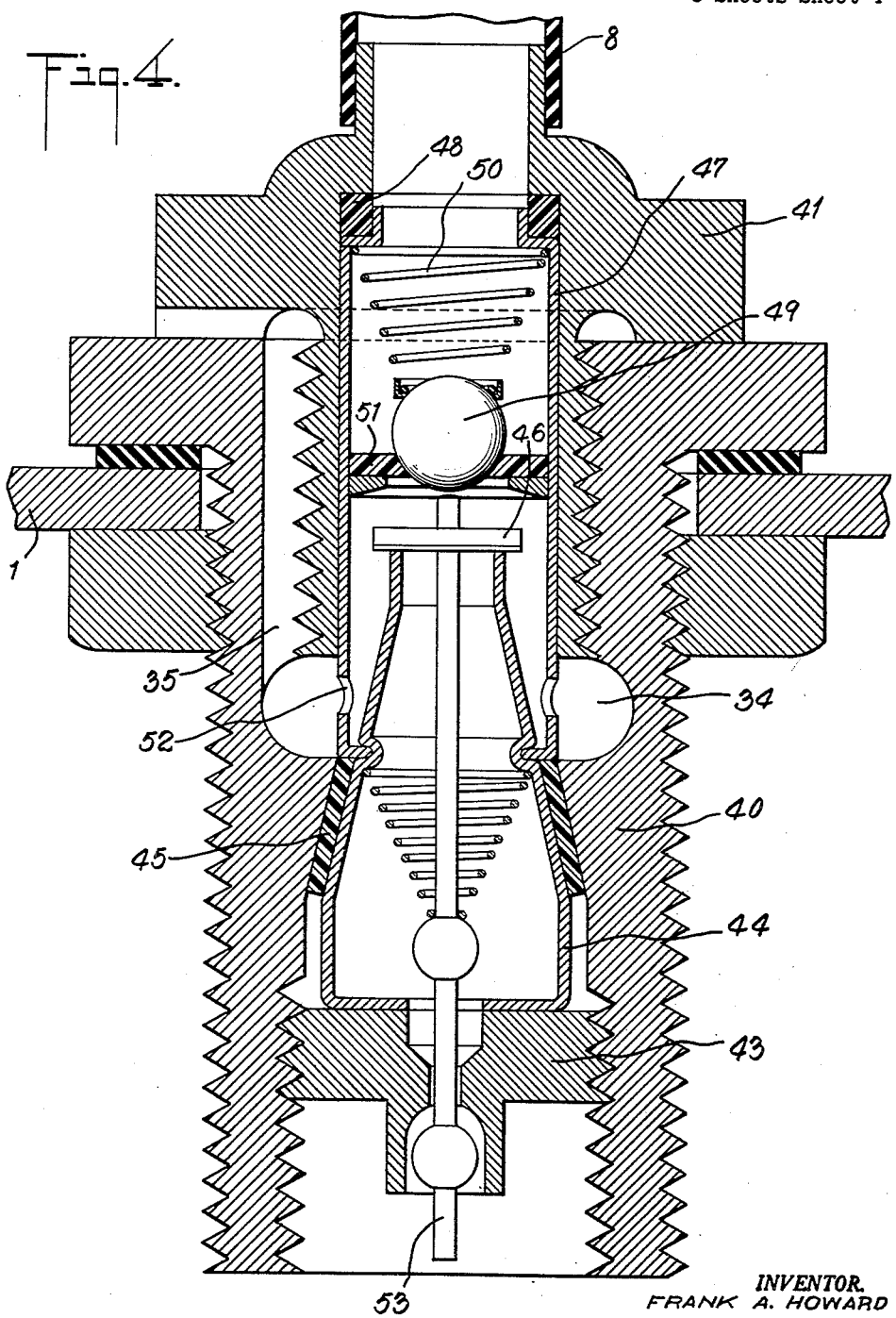

The invention will be fully understood from the following specifications taken in connection with the accompanying drawings. In these drawings Figure 1 is a diagrammatic cross section through a tire and rim embodying the invention, the dual valve being shown in elevation. Figure 2 is an enlarged longitudinal section through a simple form of valve for use in the combination shown in Figure 1, proportions of the parts being somewhat distorted for clarity of illustration. Figures 3, 4 and 5 are similar sectional views through modified forms of dual valves.

In Figure 1 the numeral 1 designates a one-piece drop-center rim, and the numeral 2 designates a conventional form of tubeless tire, the beads 3 of which seat on the rim and are forced axially outward by the internal air pressure in order to make air-tight contact with the side flanges of the rim. As shown and described in my prior application, No. 134,957, now Patent No. 2,811,189, such a tire and rim construction may be used in combination with a separate omega-type safety ring 4, the marginal channels of which embrace the beads 3 when the ring is mounted on the tire. The outer flanges 5 of these marginal channels form gaskets which preserve an airtight seal between the tire beads and the rim flanges when the tire-ring assembly is mounted on the rim and inflated. The safety ring itself must be strong enough to carry the full internal pressure of the tire in the event of failure of the casing 2 and durable enough to carry the rolling load imposed upon the safety ring when any such failure of the casing 2 occurs. When used solely as a protection against sudden deflation of the tire on a blowout or very large puncture of the casing 2 the safety ring 4 has a small hole 6 which may be bored in a metal rivet or grommet and must be large enough to permit the air to pass into the outer chamber of the tire with reasonable speed for inflation purposes, but small enough to maintain some substantial internal pressure within the safety ring 4 for a short interval to permit the driver to keep control of the car until it can be stopped, should a sudden tire failure occur. For the purpose of the present invention the grommet having the hole 6 is connected directly with the valve 7 by a rubber tube 8.

In Figure 2 I have shown one manner in which a standard form of inflation valve body 7 may be used in combination with a tube 8 connecting the valve with the air hole 6 of the safety ring 4. The connection between the tube 8 and the valve body 7 is provided by a specially formed semi-hand rubber, guttapercha, or other elastic plastic nipple 9. The nipple 9 is necked down as shown at 10 at its outer end to permit the flexible rubber tube 8 to be fastened over the neck in an airtight joint 11. There may be molded integrally with the nipple 9 a side outlet connection 12 which carries an outwardly-opening circumferentially ribbed plug-type check valve 13 normally pressed lightly against its conical seat by a helical spring 14 which is retained in position by a small ferrule and valve-guide 15 snapped over the end of the side outlet 12. The nipple 9 is somewhat smaller in diameter than the bore 16 of the valve body 7 and may be held centered in this bore by molded projections 17. The inner end of the nipple is flared outwardly, as shown at 18, at an angle matching the slope of the conical valve seat in the valve body 7. For use with a valve body in which a nipple 9 has been inserted in the position shown in Figure 2, there is required a slight modification of the standard form of valve core. The modified valve core, as illustrated in Figure 2, consists of the usual inwardly opening valve 19 held closed by a spring 20, the valve stem 21 passing outwardly through the valve nut 22 in the usual way. The metal body of the valve core designated 23 is a smooth cone-frustrum of the same angle as the valve seat in the body 7 which in turn has the same angle as the flared end 18 of the nipple 9.

Before mounting the safety ring 4 and tire casing 2 on the rim, the nipple 9 is secured by its neck to the tube 8. While the tire is in process of being mounted on the rim, it is possible to push one of the beads far enough into the central channel of the rim 1 to permit the fingers to grasp the nipple 9 and insert it in the bore of the valve body 7. The usual drop-center rim cross section may be modified if desired to make this mounting operation easier, and if desired the valve body itself may be of a type which can be screwed into the rim from the outside after the tire is mounted. In this case the nipple 9 may be pulled through the valve hole in the rim after the tire is mounted. As the nipple is being inserted in the bore of the valve body the flared nipple-end 18 is elastically compressed, and when the nipple is fully inserted, that is when the ferrule 15 comes into contact with the flanged head of the valve body, the expansion of the flared nipple-end 18 will hold the nipple in position, just clearing the conical valve seat 7′ in the body 7. The valve core 23 and its nut 22 which are loosely held together by the valve stem 21 are now inserted in the valve body in the usual way, and by threading up the valve nut 22 with a suitable tool the smooth conical face of the valve core 23 pushes the nipple inward a very slight distance and presses the flared end 18 against the conical valve seat in the body 7. Thus the flared nipple-end 18 replaces the usual conical gasket of rubber or semi-hard material which is customarily used on the valve core 23 to seat against the valve body.

When an inflation-hose is connected with the valve body 7 in the usual way the air pressure (or the central stud in the usual inflation-hose valve connection) opens the main tire valve 19. The air thus admitted passes through the tube 8 and air hole 6 and into the outer chamber of the tire. Simultaneously the check valve 13, which is held very lightly to its seat, opens to admit air freely to the inner chamber enclosed by the safety ring 4.

Removing the inflation-hose connection may permit a puff of air to escape from the outer tire chamber only, but this does no harm, since a very slight initial excess of pressure in the inner chamber is desirable. Depressing the valve stem 21 and instantly releasing it will insure this same result. If the tire be inadvertently overinflated, the valve nut 22 may be slightly loosened, which will permit simultaneous escape of air from the inner and outer tire chambers, the air from the outer chamber passing between the flared end 18 of the nipple and the valve body 7, and the air from the outer chamber passing through the tube 8, through the interior of the nipple 9 and between its flared end and the valve core 23. To dismount the tire, the valve nut 22 is run out of the valve body in the usual way. To accelerate quick and complete deflation for dismounting the tire and to avoid injury to the nipple 9 or tube 8, the nipple may be pushed completely out of the valve body into the inner tire chamber, using any blunt-pointed instrument for that purpose.

When the parts are completely assembled it will be noted that the escape of air from both chambers of the tire is prevented by the usual tire valve 19 and that the tire may be further sealed by threading the usual valve cap (not shown) on to the open end of the valve body 7.

It is desirable to have the inner tire chamber inflated somewhat more rapidly than the outer tire chamber in order to be certain that the ring 4 shall be initially distended to its normal position as shown in Figure 1. Also a slight initial excess of pressure in the inner chamber is advantageous for the same reason. The result of quicker inflation of the inner chamber will normally be accomplished when a high-pressure inflation hose is used, by making the side outlet 12 relatively large as compared with the air hole 6, and by the use of a very light spring 14 on the check valve 13. As mentioned before, it is also possible to reduce the final air pressure in the outer chamber slightly below that existing in the inner chamber merely by depressing the valve stem 21. In some instances it may be desirable to overinflate the tire by several pounds per square inch and then reduce the pressure in the outer chamber to the desired inflation pressure by depressing the valve stem 21. This will leave the inner chamber with some excess of pressure, which has two advantageous results. First, the load-deflection curve of the tire is altered so that it takes higher pressure to give an extreme tire deflection; second, the inner chamber serves as a reservoir of air to maintain longer the full inflation pressure in the outer chamber. This last result is accomplished by the slow diffusion of air through the safety ring 4 into the outer chamber of the tire so long as the pressure in the inner chamber exceeds that in the outer chamber. This diffusion rate through the ring 4 may be readily controlled by adjusting the composition and thickness of the air sealing layers of the ring 4.

As stated, the valve construction shown in Figure 2 is capable of being used in an ordinary or standard form of valve body, but requires the check valve 13 to be a separate element.

In Figures 3, 4 and 5 I have shown various methods by which modified valve bodies may be employed and in which a removable valve core carries both the main tire valve and the supplementary check valve. In Figure 3 the body of such a modified form of valve is designated 25. The inner end of this valve body has interrupted or breechblock threads 26 in its bore. A flanged nipple 27 having corresponding interrupted threads may be inserted in the bore and locked in position by a partial turn. The inner end of the nipple 27 is tapered inwardly as shown at 28, where it faces the conical valve seat 29 of the valve body 25. For this form of valve body, including the threaded nipple, there is used a special form of valve core which has the usual inwardly opening check valve 30, but carries in addition an annular sealing member 31 of wedge-shaped cross section, as shown in Figure 3. This sealing member may be made of rubber vulcanized to a re-entrant flange 32 on the body of the valve core. The thin inner margin of the sealing member 31 normally closes ports 33 formed in the tapered inner end 28 of the nipple 27, and the valve body 25 has a groove 34 to form an air channel around the inner end of the sealing member. The air channel 34 connects with the inner chamber of the tire through a longitudinal channel 35 in the valve body and a radial channel 36 in the nipple 27. The modified form of valve core described above is completed by the usual valve nut 37 loosely held in position by the valve stem 38 of the valve 30.

The modified form of valve core above described is inserted in the valve body 25 in the usual way and as the nut 37 is turned up, the annular sealing member 31 is squeezed between the opposed flaring faces 28 and 29, thus completely sealing the bore of the valve body.

When an inflation hose is applied to the open end of the valve body 25, the valve 30 opens in the usual way to admit air to the outer chamber of the tire through the tube 8 and simultaneously the pressure within the nipple 27 forces the thin flexible margin of the sealing member 31 outwardly, permitting the air to pass from the bore of the nipple through the ports 33 and thus into the inner tire chamber, by the passages 34, 35 and 36. To insure this passage of air with the lowest pressure differential, the ports 33 may be connected by a groove 39 so that the pressure within the nipple will be applied to the thin flexible margin of the sealing member 31 throughout its circumference. The sealing member 31 therefore serves the dual purpose of completely closing the bore of the valve body and providing an outwardly opening check valve to permit flow of air from the valve body into the inner tire chamber at the same time the air is passing through the nipple and its hose connection to the outer tire chamber, but preventing any return flow of air through this same course.

In this form of construction, the valve core itself, which can be removed as a unit in the usual way merely by running out the nut 37, thus carries both the normal check valve 30 and the supplementary check valve needed for the purposes of the present invention.

As noted in connection with Figure 2, the proportions of the parts in Figure 3 have been somewhat distorted for clarity of illustration.

It will be clear that the pressure in the outer tire chamber may be reduced without affecting that in the inner tire chamber merely by depressing the valve stem 38, while both chambers may be deflated by running out the valve nut 37.

In Figure 4 I have illustrated another modified form of dual valve construction in which the valve body, which is substantially the same as in Figure 3, is designated 40 and the nipple 41. As in the case of Figure 3, the nipple 41 is threaded into the inner end of the valve body with interrupted threads 42 so that a partial turn of the nipple is all that is required to lock it in position. The nipple 41, however, terminates at the groove 34 within the valve body. The valve core used in combination with the valve body 40 has the usual nut 43 and core body 44 which seats against the tapered valved seat in the valve body 40 and is sealed by an elastic gasket 45 permanently secured to the valve core 44. At the inner end of the valve core there is the usual inwardly opening check valve 46. In the construction shown in Figure 4, however, the valve body is provided with a cylindrical extension 47 which seats tightly against the shoulder in the inner end of the nipple, an air-tight seal being provided by a gasket 48. The cylindrical valve core extension 47 carries a separate check valve 49 which opens inwardly against a spring 50 which holds it normally against its seat 51. The cylindrical extension 47 of the valve core has ports 52 which open into the groove 34 in the valve body. The stem 53 of the main check valve 46 is extended slightly beyond the valve so that when the valve stem is pushed inward it may also lift the check valve 49 from its seat 51. It is believed that the manner of operation of the modified construction shown in Figure 4 will be clear from the preceding descriptions. The valve core carrying the main valve 46 and the supplementary check valve 49 may be inserted and removed as a unit, which permits immediate and cheap replacement of all working parts of both valves, without dismounting the tire. In the construction shown in Figure 4 it is also true that an open, clear passage is automatically provided both to the inner and outer tire chambers when an inflation hose is applied to the open end of the valve body. Thus if the valve 46 is opened, either by air pressure or by being mechanically pushed, the second check valve 49 is also opened. There need be only a very slight clearance between the end of the stem 53 and the ball valve 49, in order to make it certain that both this valve 49 and the main valve 46 will each seat properly under the pressure of their separate valve springs. In the construction shown in Figure 4 it is also true that both the inner and outer chambers of the tire may be deflated simultaneously merely by pushing the valve stem 53 inward. The sealing gasket 48 must be sufficiently thick and elastic so that it will reliably seal against the shoulder in the top of the nipple 41 when the valve core seats firmly on the main outer seat 45.

In the construction shown in Figure 5 the valve body 40 may be of the same shape previously described, and the nipple designated 54 is secured in the same way by the use of interrupted threads. In the construction shown in Figure 5, however, the inward end of the nipple is finished with a conical valve seat 55 which adjoins and forms a continuation of the valve seat 56 in the valve body, leaving a gap 57 as an air passage to deliver air into the groove 34. For use with this form of nipple 54, I employ a valve core having a body portion in the form of a long cone frustum 58 on which there is mounted a gasket 59 having perforations coinciding with perforations 60 in the body of the valve core. The cylindrical extension 63 on the end of the valve core body carries an inwardly opening check valve 64 held to its seat by a spring 65. The stem of the valve 61 has an upward extension 66 which stops just short of the check valve 64. The valve core is forced into position, seating the gasket 59 against the valve seat 56 in the valve body and its extension 55 in the end of the nipple 54, by the usual valve core nut 67 threaded into the bore of the valve body. The usual valve cap 68 may be employed.

The operation of the construction shown in Figure 5 is the same as that shown in Figure 4. When the inflation hose is applied to the open end of the valve body the valve stem is depressed, either mechanically by the inflation hose connection (not shown) or by the air pressure which lifts the valve 61 from its seat. Very slight movement of the valve 61 also lifts the second check valve 64 from its seat against the pressure of its own spring 65.

It will be noted that both in the construction shown in Figure 4 and that shown in Figure 5 the springs 50 and 65 which hold the ball check valves to their seats must be sufficiently strong to hold the valves seated against the air pressure within the inner tire chamber, in the event of failure of the outer tire. This is a distinction over the operation of the forms shown in Figures 2 and 3, in which the second or supplementary check valve is held to its seat by a pressure in the inner tire chamber exceeding that in the outer tire chamber.

While I have described various details and some alternatives in the construction and use of my dual valve safety pneumatic tire, it will be understood that this is only for the purpose of making the invention and its potentialities clearer and that the invention is not to be regarded as limited save in so far as such limitations are included within the terms of the appended claims, in which it is my intention to claim all novelty inherent in the invention as broadly as is permissible in view of the prior art.

What I claim is:

1. A unitary dual valve assembly for a pneumatic safety tire made up of a tubeless tire mounted on an airtight rim and provided with a safety ring dividing said tire into an outer chamber between said ring and said tire and an inner chamber between said ring and said rim, said valve assembly comprising a valve body adapted to be removably secured in a tire rim and having a central bore forming an air passage through the body with a tire valve core seat formed in said valve body adjacent the exterior end of the bore, a removable nipple having a diameter smaller than the bore and fitted centrally therein, one end of said nipple adjoining said valve core seat, the other end extending into said inner chamber, a removable valve core installed through the exterior end of the valve body and adapted to seal the bore thereof by pressure on both the valve core seat and the adjoining end of the nipple, tube means for coupling the other end of said nipple with an opening in the wall of said ring to provide a flow path to the outer tire chamber, adjustable means for moving and securing the valve core to exert or release said sealing pressure, a first check valve carried by the valve core and preventing all escape of air through the valve body when seated, and a second check valve carried by the nipple and disposed within said inner chamber to permit flow of air thereinto while preventing back flow.

2. A unitary pneumatic dual valve assembly comprising a valve body having a central bore forming an air passage therethrough and with an outwardly flaring valve core seat formed in the body adjacent the exterior end of the bore, a nipple having a diameter smaller than the bore of the valve body and fitted centrally therein, the inner end of said nipple terminating in a flare, soft elastic portion adapted to form a sealing gasket for the flared valve core seat, a removable threaded valve core installed through the exterior end of the valve body and having a seating surface adapted to compress the gasket against the said flared valve core seat, and an inwardly opening spring-loaded check valve carried by the valve core, whereby the removal of the valve core opens both the central passage through the nipple and the annular passage between the nipple and the valve body.

References Cited in the file of this patent
UNITED STATES PATENTS

| | | |
|---|---|---|
| 1,653,054 | Mack | Dec. 20, 1927 |
| 2,150,648 | Eger | Mar. 14, 1939 |
| 2,167,398 | Tubbs | July 25, 1939 |
| 2,272,548 | Creamer | Feb. 10, 1942 |
| 2,501,937 | Gramelspacher | Mar. 28, 1950 |
| 2,756,800 | Riggs | July 31, 1956 |